(12) United States Patent
Kitamura et al.

(10) Patent No.: US 9,616,637 B2
(45) Date of Patent: Apr. 11, 2017

(54) DIE FOR FORMING HONEYCOMB STRUCTURE AND MANUFACTURING METHOD THEREFOR

(71) Applicant: NGK Insulators, Ltd., Nagoya (JP)

(72) Inventors: Kazumasa Kitamura, Nagoya (JP); Hirofumi Hosokawa, Nagoya (JP); Tomoki Nagae, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 26 days.

(21) Appl. No.: 14/556,564

(22) Filed: Dec. 1, 2014

(65) Prior Publication Data

US 2015/0083325 A1    Mar. 26, 2015

Related U.S. Application Data

(63) Continuation of application No. PCT/JP2013/065418, filed on Jun. 3, 2013.

(30) Foreign Application Priority Data

Jun. 4, 2012    (JP) .................................. 2012-126946

(51) Int. Cl.
    *B23B 3/26*    (2006.01)
    *B32B 3/26*    (2006.01)
    (Continued)

(52) U.S. Cl.
    CPC .............. *B32B 3/266* (2013.01); *B28B 3/269* (2013.01); *B29C 47/085* (2013.01);
    (Continued)

(58) Field of Classification Search
    CPC ............ B32B 3/266; B32B 2037/1246; B29C 47/0852; B29C 47/085; B29C 47/30; B29C 47/0859; B29C 47/0028; B28B 3/269
    (Continued)

(56) References Cited

U.S. PATENT DOCUMENTS 4,820,146 A    4/1989    Inoue et al.
5,702,659 A    12/1997   Kragle et al.
(Continued)

FOREIGN PATENT DOCUMENTS

CN    2697183 Y     5/2005
CN    101537658 A   9/2009
(Continued)

OTHER PUBLICATIONS

International Search Report and Written Opinion (Application No. PCT/JP2013/065418) dated Jul. 9, 2013 (with English translation).
(Continued)

*Primary Examiner* — Nahida Sultana
(74) *Attorney, Agent, or Firm* — Burr & Brown, PLLC

(57) ABSTRACT

A die for forming a honeycomb structure, including: a second plate-shaped portion that is formed of iron and the like and has back holes; and a first plate-shaped portion that is formed of tungsten carbide based cemented carbide and has cavities communicating with the back holes and slits communicating with the cavities, with the first plate-shaped portion having a first layer arranged in the second plate-shaped portion side and a second layer arranged on the first layer, the cavities are opened on both sides of the first layer, and the slits are opened on both sides of the second layer.

15 Claims, 8 Drawing Sheets

(51) Int. Cl.
*B28B 3/26* (2006.01)
*B29C 47/08* (2006.01)
*B29C 47/30* (2006.01)
*B29C 47/00* (2006.01)
*B32B 37/12* (2006.01)

(52) U.S. Cl.
CPC ......... *B29C 47/0852* (2013.01); *B29C 47/30* (2013.01); *B29C 47/0028* (2013.01); *B29C 47/0859* (2013.01); *B32B 2037/1246* (2013.01)

(58) Field of Classification Search
USPC ............... 249/60; 425/113, 461, 462, 464; 264/630, 632, 638
See application file for complete search history.

(56) References Cited

U.S. PATENT DOCUMENTS

| | | |
|---|---|---|
| 6,299,813 B1 | 10/2001 | Brew et al. |
| 6,558,151 B1 | 5/2003 | Kragle |
| 2003/0001308 A1* | 1/2003 | Shibagaki ............... B28B 3/269 264/177.11 |
| 2005/0118296 A1* | 6/2005 | Kaneko ................... B23H 9/00 425/380 |
| 2006/0034972 A1 | 2/2006 | Takahashi et al. |
| 2008/0078920 A1* | 4/2008 | Takahashi ............. B23P 15/243 249/60 |
| 2009/0061040 A1* | 3/2009 | Hayashi ................. B28B 3/269 425/461 |
| 2009/0232927 A1 | 9/2009 | Takahashi et al. |
| 2009/0311470 A1* | 12/2009 | Hamatsuka .......... B01D 46/247 428/116 |
| 2010/0074982 A1* | 3/2010 | Takahashi ............. B23P 15/243 425/464 |
| 2010/0116427 A1* | 5/2010 | Shindo ................... B28B 3/269 156/244.13 |
| 2010/0143529 A1* | 6/2010 | Kitamura ............... B23P 15/243 425/464 |
| 2010/0209546 A1* | 8/2010 | Hayashi ................. B28B 3/269 425/464 |
| 2010/0244309 A1* | 9/2010 | Hayashi ................ B23P 15/243 264/177.12 |

FOREIGN PATENT DOCUMENTS

| | | |
|---|---|---|
| EP | 0 882 557 A1 | 12/1998 |
| JP | 60-222203 A1 | 11/1985 |
| JP | 60-222204 A1 | 11/1985 |
| JP | 06-022806 B2 | 3/1994 |
| JP | 09-141629 A1 | 6/1997 |
| JP | 09-174657 A1 | 7/1997 |
| JP | 2003-509250 A1 | 3/2003 |
| JP | 2006-051682 A1 | 2/2006 |
| JP | 2010-076133 A1 | 4/2010 |
| JP | 2010-228290 A1 | 10/2010 |
| JP | 2011-121081 A1 | 6/2011 |
| WO | 01/21379 AI | 3/2001 |

OTHER PUBLICATIONS

Chinese Office Action (Application No. 201380029389.6) dated Jan. 12, 2016.
International Preliminary Report on Patentability (Application No. PCT/JP2013/065418) dated Dec. 9, 2014 (in English).
Extended European Search Report (Application No. 13800290.2) dated Feb. 12, 2016.
Japanese Office Action (Application No. 2014-519993) dated Aug. 23, 2016 (with English translation).

* cited by examiner

DIE FOR FORMING HONEYCOMB STRUCTURE AND MANUFACTURING METHOD THEREFOR

BACKGROUND OF THE INVENTION

1. Field of the Invention

The present invention relates to a die for forming a honeycomb structure and a method of manufacturing the same, and more particularly, to a die for forming a honeycomb structure having a long service life and a method of manufacturing the same.

2. Description of Related Art

Heretofore, a die for forming a honeycomb structure is formed, for example, by stacking a second plate-shaped portion having a plurality of back holes opened on both sides and a first plate-shaped portion having slits communicating with the back holes formed in the second plate-shaped portion. In such a die for forming a honeycomb structure, for example, a first plate-shaped member and a second plate-shaped member having back holes are bonded through a hot pressing process, and slits communicating with the back holes are formed in the first plate-shaped member (for example, refer to Patent Document 1). Such a die for forming a honeycomb structure is used as an extrusion die for manufacturing a ceramic honeycomb structure by extruding a ceramic raw material.

Meanwhile, in the aforementioned die for forming a honeycomb structure, a width of the slit is much narrower than a diameter of the back hole. For this reason, as a ceramic raw material is introduced into the back holes, a pressure inside the back holes increases, so that a stress may be concentrated on the slits. Therefore, the slits may be easily worn or deformed disadvantageously.

For such problems, a die for forming a honeycomb structure, capable of suppressing wear or deformation of the slit has been discussed (for example, refer to Patent Document 2).

The die discussed in Patent Document 2 includes a forming trench having a lattice shape having a cross-sectional shape matching the cross-sectional shape of the honeycomb structure to be formed, and a forming portion that is formed of wear-resistant alloy and has a plurality of "apertures (cavities) having a substantially rectangular cross section" communicating with the forming trench. In addition, the die discussed in Patent Document 2 has a die base portion arranged in a "surface side of the forming portion where 'the aperture' is formed." The die base portion has a through-hole portion (back hole) communicating with the "aperture" of the forming portion.

CITATION LIST

Patent Documents

Patent Document 1: JP-A-2006-051682
Patent Document 2: JP-B-6-022806

SUMMARY OF THE INVENTION

Problem to be Solved by the Invention

In the aforementioned die discussed in Patent Document 2, when a ceramic raw material is introduced from the back hole, the ceramic raw material is introduced into the slit hole through an aperture (cavity) formed of an wear-resistant material. For this reason, the aforementioned die discussed in Patent Document 2 can solve a problem of occurrence of wear or deformation. In particular, if the plate-shaped portion having the back holes is formed of stainless steel, and the plate-shaped portion having the cavities and slits is formed of wear-resistant alloy, it is possible to suppress wear or deformation of the die.

However, since the die of Patent Document 2 has apertures (cavities), the wear-resistant alloy is grinded significantly, so that a plurality of large through holes is formed. For this reason, the first plate-shaped portion is easily cracked. In addition, since the first plate-shaped portion is easily cracked, new problem that the service life of the die is reduced occurs.

For this reason, it is necessary to lengthen a service life of the die.

The present invention has been made in view of the aforementioned problems. According to the present invention, there are provided a die for forming a honeycomb structure having a long service life and a method of manufacturing the die for forming a honeycomb structure capable of efficiently manufacturing the die for forming a honeycomb structure.

Means for Solving the Problem

According to the present invention, there are provided a die for forming a honeycomb structure and a method of manufacturing the same as follows.

According to a first aspect of the present invention, there is provided a die for forming a honeycomb structure, including: a second plate-shaped portion having back holes for introducing a forming raw material; and a first plate-shaped portion that has cavities communicating with the back holes and slits communicating with the cavities and is formed of tungsten carbide based cemented carbide, wherein the second plate-shaped portion is formed of a material containing at least one selected from a group consisting of iron, steel, aluminum alloy, copper alloy, titanium alloy, and nickel alloy, the first plate-shaped portion has a first layer arranged in the second plate-shaped portion side and a second layer arranged on the first layer, the cavities are opened on both sides of the first layer, and the slits are opened on both sides of the second layer.

According to a second aspect of the present invention, in the die for forming a honeycomb structure described in the first aspect, the first layer may have a thickness of 0.1 to 90 mm.

According to a third aspect of the present invention, in the die for forming a honeycomb structure described in the first or second aspects, the second layer may have a thickness of 0.5 to 10 mm.

According to a fourth aspect of the present invention, in the die for forming a honeycomb structure described in any one of the first to third aspects is provided, a diameter of the cavity may be different from that of the back hole.

According to a fifth aspect of the present invention, in the die for forming a honeycomb structure described in the fourth aspect, the cavity may have a diameter larger than a diameter of the back hole, and the diameter of the cavity may be 1.01 to 1.50 times of the diameter of the back hole.

According to a sixth aspect of the present invention, in the die for forming a honeycomb structure described in the fourth aspect, the back hole may have a diameter larger than a diameter of the cavity, and the diameter of the back hole may be 1.01 to 1.50 times of the diameter of the cavity.

According to a seventh aspect of the present invention, in the die for forming a honeycomb structure described in any one of the first to sixth aspects, a kind of the tungsten carbide based cemented carbide of the first layer may be different from a kind of the tungsten carbide based cemented carbide of the second layer.

According to an eighth aspect of the present invention, in the die for forming a honeycomb structure described in the seventh aspect, the first layer may be formed of tungsten carbide based cemented carbide having a Vickers hardness of 300 to 2000 HV and a Young's modulus of 200 to 600 GPa, the second layer may be formed of tungsten carbide based cemented carbide having a Vickers hardness of 500 to 3000 HV and a Young's modulus of 400 to 700 GPa, and the Vickers hardness and the Young's modulus of the second layer may be higher than the Vickers hardness and the Young's modulus of the first layer.

According to a ninth aspect of the present invention, in the die for forming a honeycomb structure described in any one of the first to eighth aspects, a bottom portion as a head of the cavity may have a flat shape, a flat shape of which corners are straightly chamfered, or an outwardly convex curved shape on a cross section perpendicular to a surface of the first plate-shaped portion.

According to a tenth aspect of the present invention, the die for forming a honeycomb structure described in any one of the first to ninth aspects may further include a buffer portion which is a space that is formed along an end of the slit in the first bonded surface side of the first plate-shaped portion, communicates with the slit, and has a width larger than a width of the slit.

According to an eleventh aspect of the present invention, there is provided a method of manufacturing a die for forming a honeycomb structure, the method including: bonding a second plate-shaped member that is formed of a material containing at least one selected from a group consisting of iron, steel, aluminum alloy, copper alloy, titanium alloy, and nickel alloy and has back holes for introducing a forming raw material and a first plate-shaped member having a first layer formed of tungsten carbide based cemented carbide, a second layer formed of the same tungsten carbide based cemented carbide as tungsten carbide based cemented carbide of the first layer, cavities opened on both sides of the first layer, and slits opened on both sides of the second layer.

According to a twelfth aspect of the present invention, in the method of manufacturing a die for forming a honeycomb structure described in the eleventh aspect, there is provided a method: preparing a first cemented carbide plate having a plurality of cavity formation through holes serving as the cavities in a plate being formed of tungsten carbide based cemented carbide and having a Vickers hardness of 300 to 2000 HV and a Young's modulus of 200 to 600 GPa, and preparing the first plated-shaped member by bonding a second cemented carbide plate formed of tungsten carbide based cemented carbide having a Vickers hardness of 500 to 3000 HV and a Young's modulus of 400 to 700 GPa and the first cemented carbide plate to each other.

According to a thirteenth apect of the present invention, in the method of manufacturing a die for forming a honeycomb structure described in the eleventh or twelfth aspects, the first layer may be formed of tungsten carbide based cemented carbide having a Vickers hardness of 300 to 2000 HV and a Young's modulus of 200 to 600 GPa, the second layer may be formed of tungsten carbide based cemented carbide having a Vickers hardness of 500 to 3000 HV and a Young's modulus of 400 to 700 GPa, and the Vickers hardness and the Young's modulus of the second layer may be higher than the Vickers hardness and the Young's modulus of the first layer.

Effect of the Invention

The die for forming a honeycomb structure according to the present invention includes a second plate-shaped portion and a first plate-shaped portion. The second plate-shaped portion is formed of a material containing at least one selected from a group consisting of iron, steel, aluminum alloy, copper alloy, titanium alloy, and nickel alloy. In addition, the back holes for introducing the forming raw material are formed in the second plate-shaped portion. The first plate-shaped portion is formed of tungsten carbide based cemented carbide. Furthermore, the first plate-shaped portion has cavities communicating with the back holes and the slits communicating with the cavities. In addition, the first plate-shaped portion is constructed of first layer and second layer. Furthermore, the cavities are opened on both sides of the first layer, and the slits are opened on both sides of the second layer. In this manner, since the first plate-shaped portion of the die for forming a honeycomb structure according to the present invention has a double-layered structure having the first layer and second layer, a stress during extrusion is alleviated, and it is possible to prevent a damage and the like. For this reason, the die for forming a honeycomb structure according to the present invention has a long service life.

In the method of manufacturing a die for forming a honeycomb structure according to the present invention, the die for forming a honeycomb structure is manufactured by bonding the second plate-shaped member having back holes and the first plate-shaped member having "the first layer and the second layer arranged on the first layer". In addition, the second plate-shaped member is formed of a material containing at least one selected from a group consisting of iron, steel, aluminum alloy, copper alloy, titanium alloy, and nickel alloy. In addition, the first layer and second layer are formed of tungsten carbide based cemented carbide. Furthermore, the cavities are opened on both sides of the first layer, and the slits are opened on both sides of the second layer. For this reason, it is possible to manufacture a die for forming a honeycomb structure having a long service life.

DETAILED DESCRIPTION OF THE INVENTION

Hereinafter, embodiments of the present invention will be described in detail with reference to the accompanying drawings. It would be appreciated by those skilled in the art that the invention is not limited to the following embodiments, and they may be appropriately modified or changed without departing from the spirit and scope of the invention.

Figure 1:
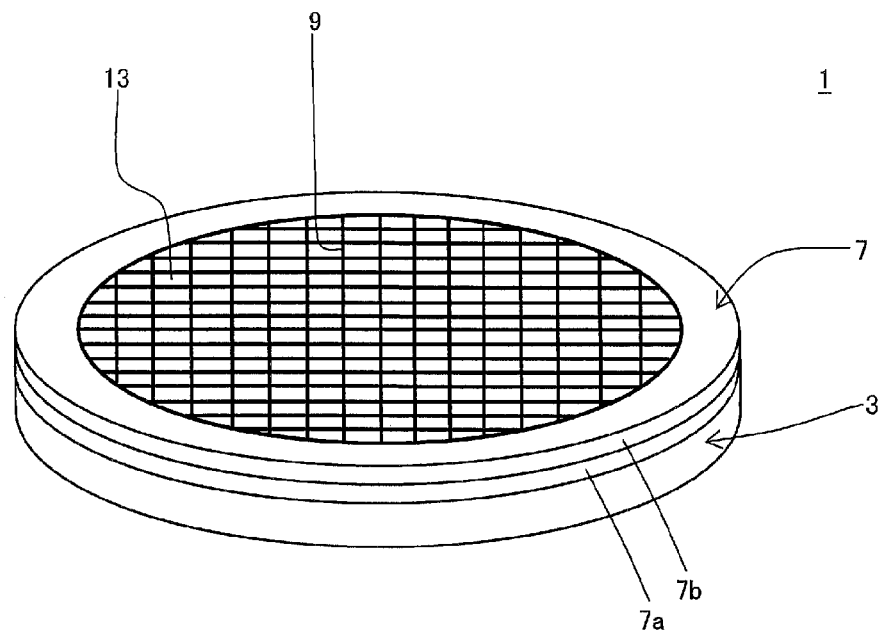
FIG. 1 is a perspective view schematically showing a die for forming a honeycomb structure according to an embodiment of the present invention as seen from a first plate-shaped portion side where slits are formed.
Figure 2:
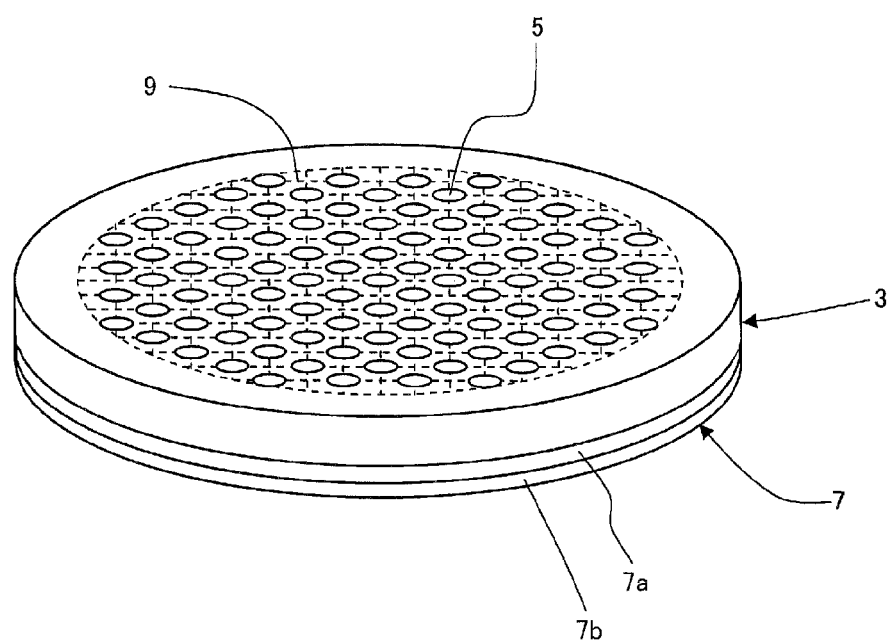
FIG. 2 is a perspective view schematically showing a die for forming a honeycomb structure according to an embodiment of the present invention as seen from a second plate-shaped portion where back holes are formed.
Figure 3:
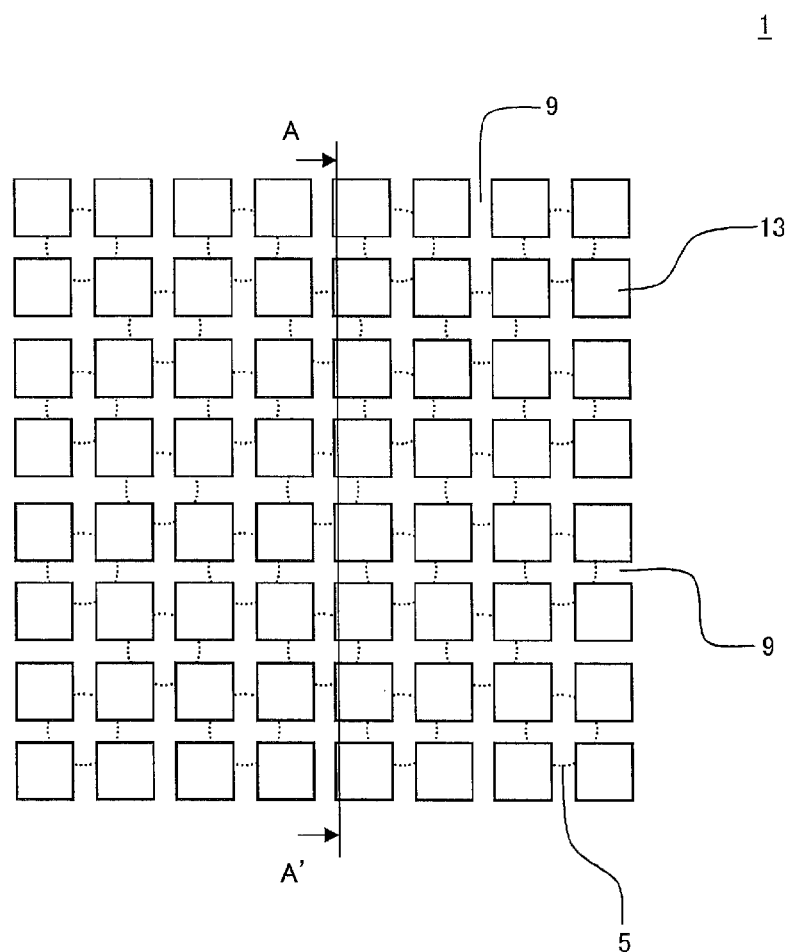
FIG. 3 is an enlarged plan view partially showing a surface of the first plate-shaped portion side of the die for forming a honeycomb structure of FIG. 1.
Figure 4A:
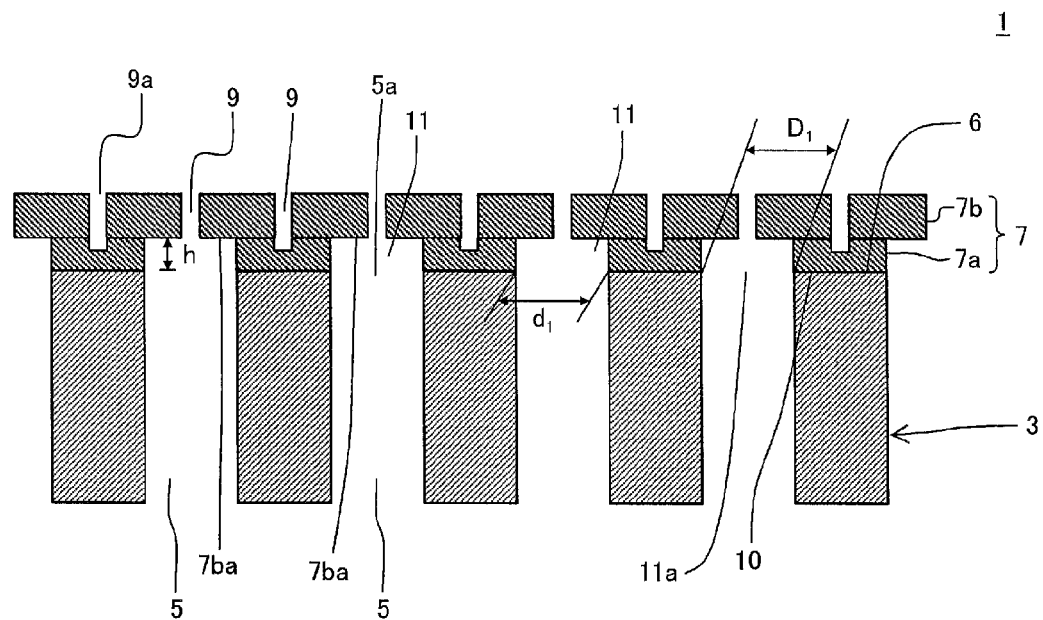
FIG. 4A is a schematic diagram showing a cross section taken along a line A-A' of the die for forming a honeycomb structure of FIG. 3.

(1) Die for Forming Honeycomb Structure:

A die for forming a honeycomb structure according to an embodiment of the present invention will be described. FIG. 1 is a perspective view schematically showing a die for forming a honeycomb structure according to an embodiment of the present invention as seen from a first plate-shaped portion side where slits are formed. FIG. 2 is a perspective view schematically showing a die for forming a honeycomb structure according to an embodiment of the present invention as seen from a second plate-shaped portion side where back holes are formed. FIG. 3 is an enlarged plan view partially showing a surface of the first plate-shaped portion side of the die for forming a honeycomb structure of FIG. 1. FIG. 4A is a schematic diagram illustrating a cross section taken along a line A-A' in the die for forming a honeycomb structure of FIG. 3. The die for forming a honeycomb structure of FIG. 4A has a state that an open end of a cavity on a first bonded surface is arranged to coincide with an open end of a back hole on a second bonded surface.

As shown in FIGS. 1 to 4A, a die 1 for forming a honeycomb structure according to this embodiment includes a second plate-shaped portion 3 and a first plate-shaped portion 7 formed of tungsten carbide based cemented carbide. The second plate-shaped portion 3 is formed of a material containing at least one selected from a group consisting of iron, steel, aluminum alloy, copper alloy, titanium alloy, and nickel alloy. The second plate-shaped portion 3 has back holes 5 for introducing a forming raw material. The first plate-shaped portion 7 has cavities 11 communicating with the back holes 5 and slits 9 communicating with the cavities 11. In addition, the first plate-shaped portion 7 has a first layer 7a arranged in the second plate-shaped portion 3 side and a second layer 7b arranged on the first layer 7a. Furthermore, the cavities 11 are formed to be opened on both sides of the first layer 7a, and the slits 9 are formed to be opened on both sides of the second layer 7b. If the die 1 for forming a honeycomb structure is formed in this manner, it is possible to increase a service life of the die.

A thickness of the die for forming a honeycomb structure according to this embodiment is preferably set to 5 to 100 mm, but not particularly limited thereto. If the thickness of the die is thinner than 5 mm, the die may be broken during the formation. If the thickness of the die is thicker than 100 mm, a pressure loss may become significant during the formation of the honeycomb structure, so that it may be difficult to perform formation.

(1-1) Second Plate-Shaped Portion:

The second plate-shaped portion 3 is formed of a material containing at least one selected from a group consisting of iron, steel, aluminum alloy, copper alloy, titanium alloy, and nickel alloy. The steel is a material containing at least one selected from a group consisting of stainless steel, die steel, and high-speed steel. Out of such materials, steel is preferably selected as a material of the second plate-shaped portion 3. More preferably, stainless steel is selected. It is noted that the "material containing at least one selected from a group consisting of iron, steel, aluminum alloy, copper alloy, titanium alloy, and nickel alloy" may be referred to herein as "free cutting material." The "free cutting material" is a material easily grindable compared to tungsten carbide based cemented carbide. The second plate-shaped portion 3 is less influenced by wear, compared to the first plate-shaped portion 7, because no slit is formed. Since the second plate-shaped portion 3 is formed of "free cutting material", it has excellent workability, compared to tungsten carbide based cemented carbide. In addition, since a cost of the "free cutting material" is lower than that of tungsten carbide based cemented carbide, it is possible to lower the manufacturing cost.

As the aforementioned "stainless steel" as a kind of the material of the second plate-shaped portion 3, stainless steel known in the art may be used. For example, the stainless steel may include SUS304, SUS303, and the like.

The second plate-shaped portion 3 may have a desired size depending on a utilization purpose without any particular limitation. It is noted that, if the second plate-shaped portion 3 has a disk shape, a diameter of the disk (diameters of one side and the other side) is preferably set to 30 to 500 mm.

A thickness of the second plate-shaped portion 3 may be determined appropriately depending on a utilization purpose considering a shape of the slit or a shape of the back hole and the like without any particular limitation.

(Back Hole)

The back holes 5 for introducing a forming raw material are formed in the second plate-shaped portion 3. The "back hole 5" is a through hole for introducing a forming raw material (the hole opened to both sides of the second plate-shaped portion 3). When a honeycomb structure is formed using the die for forming a honeycomb structure 1, the forming raw material of the honeycomb structure is introduced from the back holes 5.

The shape of the back hole 5 is not particularly limited as long as it can guide the introduced forming raw material into the cavity 11 and the slit 9. For example, a shape of the back hole in the "cross section perpendicular to a direction where the forming raw material flows (the thickness direction of the second plate-shaped portion)" is preferably circular. In addition, a diameter of the open end of the back hole 5 is preferably set to 0.5 to 5.0 mm, and more preferably, 0.8 to 3.0 mm. Such a back hole 5 may be formed, for example, using various machining methods such as electrochemical machining (ECM), electrical discharge machining (EDM), laser machining, and mechanical machining such as drilling. Out of these methods, the electrochemical machining (ECM) is preferably employed because the back holes 5 can be formed efficiently and accurately. A space of the back hole preferably has a cylindrical shape. In this case, a diameter (diameter of the back hole) on the "cross section perpendicular to a direction where the forming raw material flows (thickness direction of the second plate-shaped portion)" of the back hole becomes constant. In this case, the diameter of the back hole is equal to the "diameter of the open end of the back hole on the second bonded surface." Furthermore, the number of the back holes may be appropriately determined depending on a shape and the like of the honeycomb structure to be manufactured without any particular limitation.

(1-2) First Plate-Shaped Portion:

The first plate-shaped portion 7 is comprised of a plate-shaped member formed of tungsten carbide based cemented carbide. A width of the slit 9 is much narrower than the diameter of the back hole 5. For this reason, when extrusion is performed for the forming raw material, a pressure inside the back hole 5 increases, so that a defect such as wear or deformation easily occur due to a stress concentrated on the slit 9. Therefore, the first plate-shaped portion 7 is formed of tungsten carbide based cemented carbide having a high wear resistance.

The "tungsten carbide based cemented carbide (cemented carbide)" refers to alloy obtained by sintering tungsten carbide and a binder. The binder is metal containing at least one selected from a group consisting of cobalt (Co), iron (Fe), nickel (Ni), titanium (Ti), and chromium (Cr) preferably. Such tungsten carbide based cemented carbide has an especially excellent wear resistance or mechanical strength.

The first plate-shaped portion 7 may have a desired size depending on a utilization purpose without any particular limitation. However, when the first plate-shaped portion 7 has a disk shape, a diameter of the disk is preferably set to 30 to 500 mm. When the first plate-shaped portion 7 and the second plate-shaped portion 3 have a disk shape, a diameter of the first plate-shaped portion 7 is preferably set to 90 to 100% of the diameter of the second plate-shaped member 3.

It is noted that a thickness of the first plate-shaped portion 7 is preferably set to 0.6 to 95 mm, and more preferably 1.0 to 20 mm. In addition, the thickness of the first plate-shaped portion 7 is preferably set to 0.05 to 5 times of the thickness of the second plate-shaped portion 3.

The first plate-shaped portion 7 has a first layer 7a arranged in the second plate-shaped portion 3 side and a second layer 7b arranged on the first layer 7a. In the die for forming a honeycomb structure 1 according to this embodiment, since the first plate-shaped portion has a double-layered structure including the first layer 7a and second layer 7b in this manner, it is possible to alleviate stress during the extrusion and prevent damage. The first layer 7a and second layer 7b may be formed of the same kind or different kinds of material.

(First Layer)

The first layer 7a is one of layers of the first plate-shaped portion 7, arranged in the second plate-shaped portion 3 side. The cavities 11 are formed in the first layer 7a. In addition, the first layer 7a is formed of cemented carbide having a Vickers hardness of 300 to 2000 HV and a Young's modulus of 200 to 600 GPa. If the first layer 7a has the Vickers hardness and the Young's modulus described above, it is possible to provide a layer having the hardness and toughness resistible to the stress applied to the cavities 11. For this reason, it is possible to prevent a crack of the first plate-shaped portion 7 generated by a stress of the ceramic raw material flowing from the back holes 5 into the cavities 11 and lengthen a service life of the die. The cavities 11 are opened on both sides of the first layer 7a.

The first layer 7a preferably has a Vickers hardness of 300 to 2000 HV, and more preferably 300 to 1500 HV. If the first layer 7a has the Vickers hardness as described above, the first layer 7a can obtain the hardness resistible to a stress of the ceramic raw material flowed into the cavities 11 from the back holes 5. For this reason, it is possible to prevent wear of the cavities 11. If the Vickers hardness of the first layer 7a is lower than 300 HV, wear may be generated due to an insufficient strength. In addition, when the Vickers hardness of the first layer 7a is higher than 2000 HV, the first layer 7a may be easily cracked because it is too hard.

The first layer 7a preferably has a Young's modulus of 200 to 600 GPa, and more preferably 300 to 500 GPa. As a result, it is possible to prevent a damage of the first layer 7a. If the Young's modulus of the first layer 7a is lower than 200 GPa, the toughness is too low, so that a failure such as a crack may be generated. In addition, when the Young's modulus exceeds 600 GPa, the toughness is too high, so that the cavity 11 may be deformed. If the honeycomb structure is formed using the die having deformed cavities 11, a distortion is generated in the honeycomb structure, so that formability is degraded.

(Second Layer)

The second layer 7b is the one residual layer of the first plate-shaped portion 7. The second layer 7b is arranged on the first layer 7a. The slits 9 are formed in the second layer 7b. The slits 9 are opened on both sides of the second layer 7b. The "both sides of the second layer 7b" include both a surface of the second layer 7b coming into contact with the first layer 7a and a surface opposite (back) to the "surface coming into contact with the first layer 7a." An outlet portion of the slit for discharging the forming raw material is referred to as an open end 9a of the slit 9. In addition, the second layer 7b preferably has a Vickers hardness of 500 to 3000 HV and a Young's modulus of 400 to 700 GPa. If the second layer 7b has the Vickers hardness and the Young's modulus as described above, the second layer 7b becomes a layer having toughness and hardness resistible to a stress applied to the slit 9. For this reason, it is possible to prevent deformation or wear of the slit 9.

The second layer 7b preferably has a Vickers hardness of 500 to 3000 HV, and more preferably, 2000 to 3000 HV. If the second layer 7b has the Vickers hardness as described above, it is possible to suppress wear of the second layer 7b. If the Vickers hardness of the second layer 7b is lower than 500 HV, wear may be easily generated due to an insufficient hardness. In addition, if the Vickers hardness is higher than 3000 HV, the second layer 7b may be easily cracked.

The second layer 7b preferably has a Young's modulus of 400 to 700 GPa, and more preferably 500 to 700 GPa. If the second layer 7b has the Young's modulus as described above, the second layer 7b may not be easily cracked. If the Young's modulus of the second layer 7b is lower than 400 GPa, a crack may be easily generated due to too low toughness. In addition, if the Young's modulus is higher than 700 GPa, the second layer 7b may be deformed due to too high toughness.

(Relationship between First Layer and Second Layer)

In the die for forming a honeycomb structure according to this embodiment, the Vickers hardness and the Young's modulus of the second layer 7b are preferably higher than the Vickers hardness and the Young's modulus of the first layer 7a. That is, it is preferable that the Vickers hardness of the second layer 7b be higher than the Vickers hardness of the first layer 7a, and the Young's modulus of the second layer 7b be higher than the Young's modulus of the first layer 7a. In this relationship, the second layer 7b having the slits 9 becomes resistant to wear, and the first layer 7a having the cavities 11 is not easily cracked. With the second layer 7b capable of suppressing wear and the first layer 7a suppressing a crack, it is possible to lengthen a service life of the die for forming a honeycomb structure.

In the die for forming a honeycomb structure according to this embodiment, it is preferable that the Vickers hardness of the second layer 7b be higher than the Vickers hardness of the first layer 7a by 1000 to 2500 HV, and the Young's modulus of the second layer 7b be higher than the Young's modulus of the first layer 7a by 50 to 300 GPa. As a result, it is possible to reliably form the second layer 7b having a wear resistance and the first layer 7a having high toughness in the first plate-shaped portion 7 and lengthen a service life of the die.

The first layer 7a preferably has a thickness of 0.1 to 90 mm, and more preferably 0.2 to 65 mm. If the first layer 7a has a thickness within this range, it is possible to effectively suppress wear of the second plate-shaped portion. If the thickness of the first layer 7a is smaller than 0.1 mm, the second plate-shaped portion may be easily worn. If the thickness of the first layer 7a is larger than 90 mm, the die for forming a honeycomb structure becomes too thick, so that a pressure in the extrusion may excessively increase.

The second layer 7b preferably has a thickness of 0.5 to 10 mm, and more preferably 1 to 6 mm. If the second layer 7b has a thickness within this range, it is possible to suppress deformation of the honeycomb structure formed by extrusion. If the thickness of the second layer 7b is smaller than 0.5 mm, a shape of the honeycomb structure obtained by extrusion may be deformed. The second layer 7b may be worn or deformed. In addition, if the thickness of the second layer 7b is larger than 10 mm, the second layer 7b becomes too thick, and a depth of the slit (length of the slit in a direction where the forming raw material is extruded) becomes too large, so that the pressure of the extrusion may significantly increase.

(Slit)

In the first plate-shaped portion 7, slits 9 for forming a forming raw material are formed to communicate with the cavities 11. The slit is a crevice (notch) formed in the first plate-shaped portion 7. The forming raw material introduced from the back hole 5 enters the slit 9 inside the die for forming a honeycomb structure and is then extruded from the open end 9a of the slit 9, so that a honeycomb formed body is formed.

The slit 9 is opened on both sides of the second layer. The slit may be formed only in the second layer. Preferably, the slit is formed in the first layer as well. When the slit is formed in the first layer, the slit is preferably formed in the first layer so that the slit formed in the second layer extends to the first layer side. In this case, the slit to be formed in the first layer is formed on the "surface coming into contact with the second layer" of the first layer. In addition, the depth of the slit is larger than the thickness of the second layer. The slit preferably has a depth of 0.5 to 10 mm, and more preferably 1 to 8 mm. An extension of the slit extending to the first layer side preferably has a depth of 0.1 to 10 mm, and more preferably 0.2 to 5 mm. As a result, it is possible to form an excellent honeycomb-shaped formed body.

An area where the slit is formed on the first plate-shaped portion 7 or a formation pattern of the slit may be appropriately determined depending on a utilization purpose without any particular limitation. For example, the formation pattern of the slit may have a polygonal shape such as triangle, rectangle, pentagon, hexagon, and octagon or a round shape, or may be a combinational pattern having a plurality of shapes including a polygonal shape and a circular shape on a cross section perpendicular to a direction where the forming raw material is extruded (flows). For example, in the die for forming a honeycomb structure 1 illustrated in FIGS. 1 to 3, a formation pattern of the slit 9 has a rectangular shape on the cross section perpendicular to a direction where the forming raw material is extruded.

A width of the slit may be appropriately determined depending on a shape of the honeycomb structure to be formed. For example, in order to manufacture a die for forming a honeycomb structure for extruding a ceramic honeycomb structure for a general exhaust gas filter or a catalyst carrier, the slit preferably has a width of 0.05 to 1.0 mm, and more preferably 0.06 to 0.5 mm.

(Cavity)

The "cavity 11" is formed in the first layer 7a of the first plate-shaped portion 7. The "cavity 11" is formed to communicate with the back hole 5 formed in the second plate-shaped portion 3 and the slit 9 formed in the first plate-shaped portion 7. In addition, the "cavity 11" is a through hole formed in the first layer of the first plate-shaped portion 7. That is, the "cavity 11" is a through hole opened on the "surface of the first layer coming into contact with the second plate-shaped portion (first bonded surface 10 of the first plate-shaped portion 7)" and opened on the "surface of the second layer coming into contact with the first layer (one surface 7ba of the second layer)". As shown in FIG. 4A, the first bonded surface 10 is a surface of the first plate-shaped portion 7 bonded to (coming into contact with) the second plate-shaped portion 3. Since the "cavity 11" is formed in this manner, the forming raw material introduced from the back hole 5 provided in the second plate-shaped portion 3 passes through the "cavity 11" and enters the slit 9. In addition, the forming raw material is extruded from the open end 9a of the slit to form a honeycomb-shaped formed body (honeycomb structure).

The cavity 11 preferably has a depth h of 0.1 to 90 mm (refer to FIG. 4A), and more preferably 0.2 to 65 mm. In this manner, by setting the depth h of the cavity 11 to this range, it is possible to effectively suppress wear of the second plate-shaped portion. If the depth h of the cavity is smaller than 0.1 mm, a strength of the first plate-shaped member may be easily degraded when the forming raw material is extruded. If the depth h of the cavity is larger than 90 mm, it is difficult to form the cavity by machining the first plate-shaped member when the die for forming a honeycomb structure according to this embodiment is fabricated. Here, the "depth h of the cavity 11" refers to a distance from the first bonded surface 10 of the first plate-shaped portion 7 to one surface 7ba of the second layer 7b as shown in FIG. 4A. It is noted that the depth of the cavity 11 matches the thickness of the first layer 7a.

A diameter of an open end 11a of the cavity is preferably set to 0.5 to 5.0 mm, and more preferably 0.8 to 3.0 mm. The cavity 11 may be formed, for example, using various machining methods such as electrochemical machining (ECM), electrical discharge machining (EDM), laser machining, and mechanical machining such as drilling. The electrochemical machining (ECM) is preferably employed out of these methods because the cavity 11 can be formed efficiently and accurately. A space of the cavity is preferably cylindrical. In this case, a diameter (diameter of the cavity) on the "cross section perpendicular to a direction where the forming raw material flows (thickness direction of the first plate-shaped portion)" in the cavity becomes constant. In addition, in this case, the diameter of the cavity 11 becomes equal to the "diameter of the open end 11a of the cavity on the first bonded surface 10." Furthermore, the number of the cavities 11 is preferably equal to the number of the back holes.

(Relationship Between Open End of Cavity and Open End of Back Hole)

As shown in FIG. 4A, in the die for forming a honeycomb structure 1 according to this embodiment, a diameter $d_1$ of the "(circular) open end 11a of the cavity" on the first bonded surface 10 is equal to a diameter $D_1$ of a "(circular) open end 5a of the back hole" on the second bonded surface 6. Here, as shown in FIG. 4A, the second bonded surface 6 is a surface of the second plate-shaped portion 3 bonded to (coming into contact with) the first plate-shaped portion 7.

The "open end 11a of the cavity on the first bonded surface" is an inlet portion of the through hole (inlet portion for introducing the forming raw material) opened on the first bonded surface 10. In addition, the "open end 5a of the back hole on the second bonded surface" is an "outlet portion opened on the second bonded surface 6 in the second bonded surface 6 side" (outlet portion of the formation raw material). A ceramic raw material is supplied to the cavity 11 at the same time it passes through the outlet portion.

The ceramic honeycomb structure extruded using the die for forming a honeycomb structure 1 according to this embodiment is a ceramic honeycomb structure having a porous partition wall defining and forming a plurality of cells extending in a fluid flow direction. The forming raw material used in the manufacturing of the ceramic honeycomb structure using the die for forming a honeycomb structure 1 according to this embodiment is a raw material obtained by mixing and kneading water, a binder, a pore former, and the like with ceramic powder.

Figure 4B:
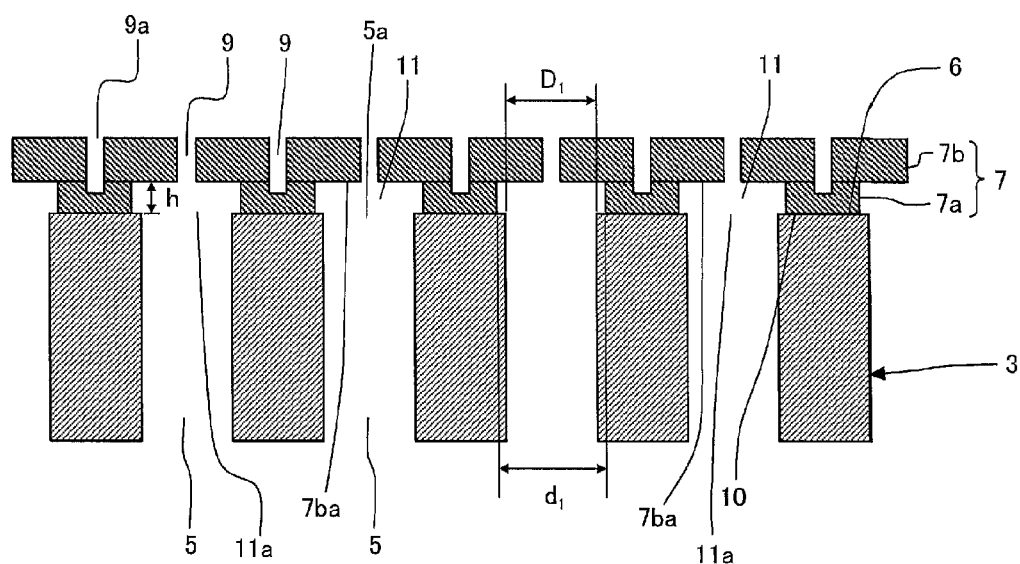
FIG. 4B is a schematic diagram showing a cross section in parallel with a thickness direction of the die for forming a honeycomb structure according to another embodiment of the present invention.

(1-3) Another Embodiment of Die for Forming Honeycomb Structure of the Present Invention:

Next, a description will be made for a die for forming a honeycomb structure according to another embodiment of the present invention. A die for forming a honeycomb structure 1A according to this embodiment is configured as described below. Specifically, as shown in FIG. 4B, in the die for forming a honeycomb structure according to an embodiment of the present invention (refer to FIG. 4A), the diameter $d_1$ of the open end 11a of the cavity on the first bonded surface 10 has a size different from that of the diameter $D_1$ of the open end 5a of the back hole on the second bonded surface 6. In addition, as shown in FIG. 4B, in the die for forming a honeycomb structure 1A according to this embodiment, the diameter $d_1$ of the open end of the cavity 11 on the first bonded surface 10 is larger than the diameter $D_1$ of the open end of the back hole 5 on the second bonded surface 6. Furthermore, the open end 11a of the cavity and the open end 5a of the back hole are arranged such that the open end 5a of the back hole on the second bonded surface 6 is located inside the open end 11a of the cavity on the first bonded surface 10. For this reason, the forming raw material inside the cavity 11 make a uniform flow and is introduced into the slit with a uniform pressure. As a result, it is possible to prevent a shape of the honeycomb-shaped formed body to be formed from being deformed. FIG. 4B is a schematic diagram showing the "cross section in parallel to the thickness direction" of a die for forming a honeycomb structure according to another embodiment of the present invention.

The phrase "the open end 5a of the back hole on the second bonded surface 6 is located inside the open end 11a of the cavity on the first bonded surface 10" has the following meaning. Specifically, the cavity 11 having a large opening diameter and the back hole 5 having a small opening diameter communicate with each other, and the outer circumference (outer edge) of the open end of the cavity 11 and the outer circumference (outer edge) of the open end of the back hole 5 do not intersect with each other. It is noted that a state that the outer circumference (outer edge) of the open end of the back hole 5 is inscribed with the outer circumference (outer edge) of the open end of the cavity 11 is included in the meaning of the phrase "the open end 5a of the back hole on the second bonded surface 6 is located inside the open end 11a of the cavity on the first bonded surface 10."

In the die for forming a honeycomb structure 1A according to this embodiment, the "diameter $d_1$ of the open end 11a of the cavity on the first bonded surface 10" is preferably 1.01 to 1.50 times of the "diameter $D_1$ of the open end 5a of the back hole on the second bonded surface 6." As a result, it is possible to improve formability when the honeycomb structured formed body is formed. If the ratio of the diameter is smaller than 1.01, the open end of the cavity and the open end of the back hole may be deviated from each other when the first plate-shaped portion and second plate-shaped portion are bonded to each other during the manufacturing of the die for forming a honeycomb structure. If the ratio of the diameter is larger than 1.50, it may be difficult to form a desired formed structure by coupling the back holes to each other.

Figure 4C:
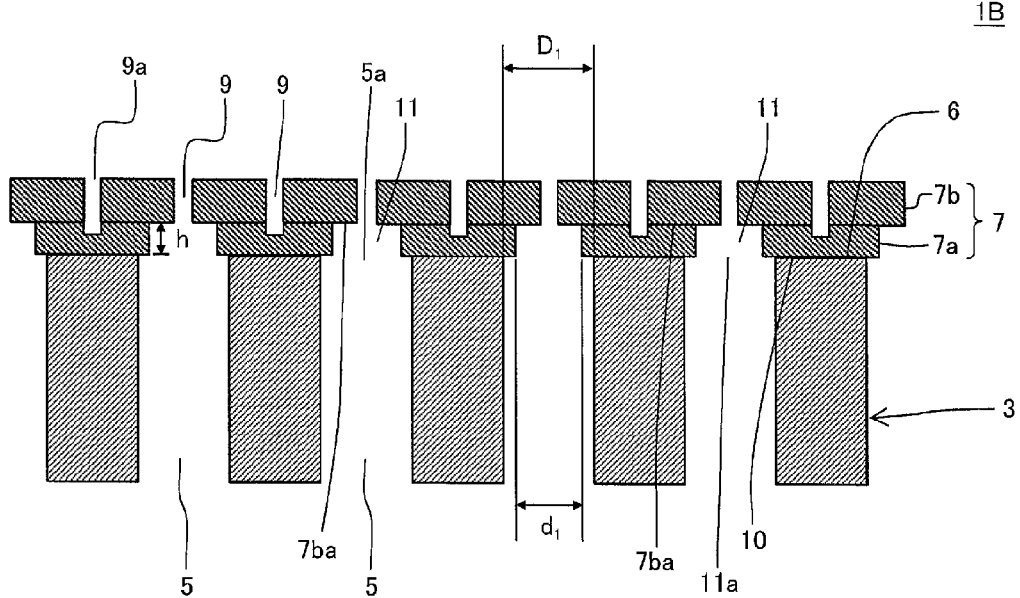
FIG. 4C is a schematic diagram showing a cross section in parallel with a thickness direction of the die for forming a honeycomb structure according to further another embodiment of the present invention.

(1-4) Still Another Embodiment of Die for Forming Honeycomb Structure of the Present Invention:

Next, a die for forming a honeycomb structure according to further another embodiment of the present invention will be described. A die for forming a honeycomb structure 1B according to this embodiment is configured as follows. Specifically, as shown in FIG. 4C, in the die for forming a honeycomb structure according to an embodiment of the present invention (refer to FIG. 4A), the diameter $d_1$ of the open end 11a of the cavity on the first bonded surface 10 has a size different from that of the diameter $D_1$ of the open end 5a of the back hole on the second bonded surface 6. In addition, as shown in FIG. 4C, in the die for forming a honeycomb structure 1B according to this embodiment, the diameter $D_1$ of the open end of the back hole 5 on the second bonded surface is larger than the diameter $d_1$ of the open end of the cavity 11 on the first bonded surface. Furthermore, the open end 11a of the cavity and the open end 5a of the back hole are arranged such that the open end 11a of the cavity on the first bonded surface 10 is located inside the open end 5a of the back hole on the second bonded surface 6. For this reason, the forming raw material inside the cavity 11 make a uniform flow and is introduced into the slit with a uniform pressure. As a result, it is possible to prevent a shape of the honeycomb-shaped formed body from being deformed. FIG. 4C is a schematic diagram showing the "cross section in parallel to the thickness direction" of a die for forming a honeycomb structure according to further another embodiment of the present invention.

The phrase "the open end 11a of the cavity on the first bonded surface 10 is located inside the open end 5a of the back hole on the second bonded surface 6" has the following meaning. Specifically, it means that the back hole 5 having a large opening diameter and the cavity 11 having a small opening diameter communicate with each other, and the outer circumference (outer edge) of the open end of the back hole 5 and the outer circumference (outer edge) of the open end of the cavity 11 do not intersect with each other. It is noted that a state that the outer circumference (outer edge) of the open end of the cavity 11 is inscribed with the outer circumference (outer edge) of the open end of the back hole 5 is included in the meaning of the phrase "the open end 11a of the cavity on the first bonded surface 10 is located inside the open end 5a of the back hole on the second bonded surface 6."

In a die for forming a honeycomb structure 1C according to this embodiment, the "diameter $D_1$ of the open end 5a of the back hole on the second bonded surface 6" is preferably 1.01 to 1.50 times of the "diameter $d_1$ of the open end 11a of the cavity on the first bonded surface 10." As a result, it is possible to improve formability when structure honeycomb structured formed body (honeycomb structure) is formed. If the ratio of the diameter is smaller than 1.01, the open end of the cavity and the open end of the back hole may be deviated from each other when the first plate-shaped portion and second plate-shaped portion are bonded to each other during the manufacturing of the die for forming a honeycomb structure. If the open end of the cavity and the open end of the back hole are deviated from each other, the honeycomb structure obtained by the formation may be easily deformed. If the ratio of the diameter is larger than 1.50, it may be difficult to form a desired formed structure by coupling the back holes to each other. The shape of the open end of the cavity and the shape of the open end of the back hole are preferably circular, but not limited thereto.

Figure 5:
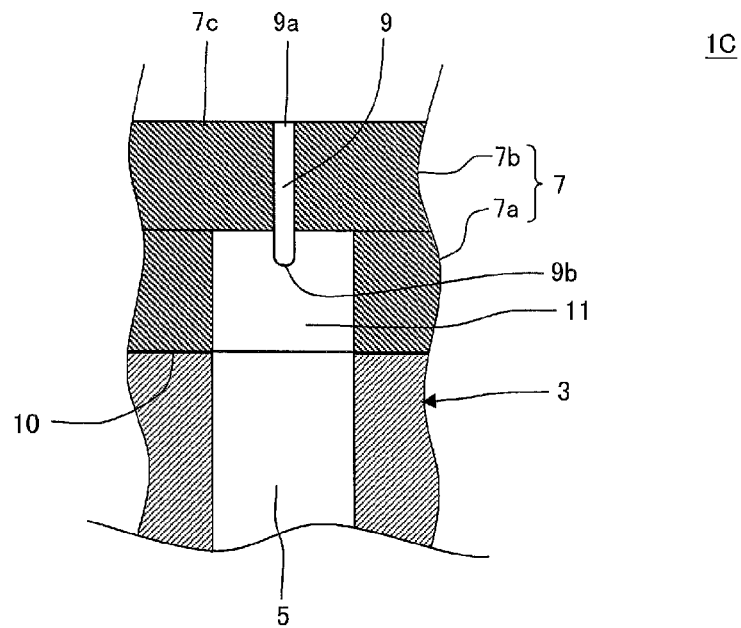
FIG. 5 is a cross-sectional view partially showing a cross section perpendicular to the slit in a die for forming a honeycomb structure according to still another embodiment of the present invention.
Figure 6:
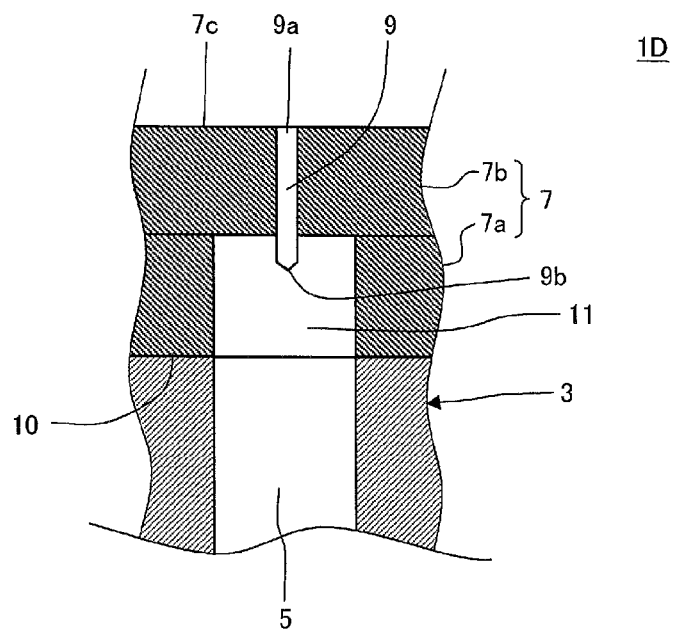
FIG. 6 is a cross-sectional view partially showing a cross section perpendicular to the slit in a die for forming a honeycomb structure according to still another embodiment of the present invention.
Figure 7:
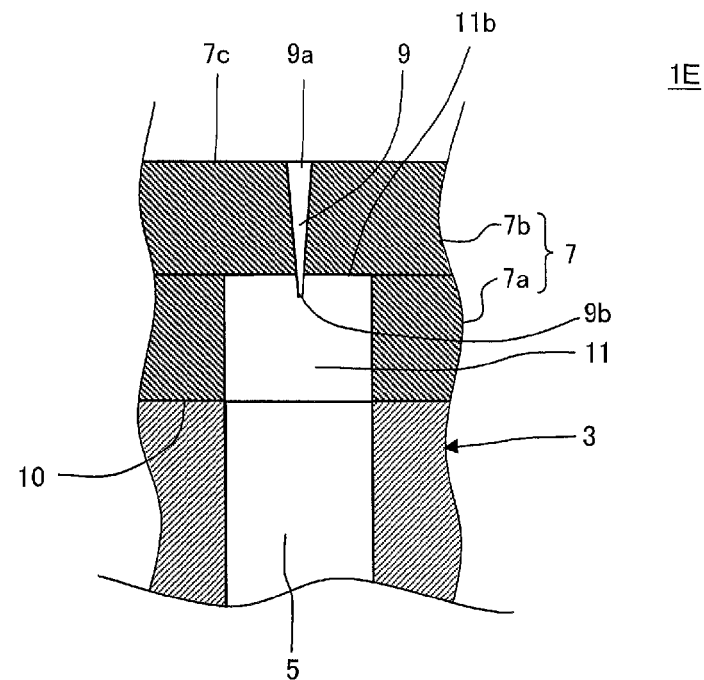
FIG. 7 is a cross-sectional view partially showing a cross section perpendicular to the slit in a die for forming a honeycomb structure according to still another embodiment of the present invention.

In the die for forming a honeycomb structure according to the present invention, as shown in FIG. 5, a "bottom portion 9b of the slit" preferably has an "outwardly convex curved shape on the cross section perpendicular to the slit 9." Herein, the "cross section perpendicular to the slit 9" means a cross section perpendicular to the slit 9 and in parallel with the depth direction of the slit 9 (directed from the surface of the first plate-shaped portion to the inside). The bottom portion 9b of the slit is an end of the slit 9 in the "first bonded surface 10 side of the first plate-shaped portion 7" on the cross section perpendicular to the slit 9. It is noted that an end of the slit 9 in a "surface 7c side of the first plate-shaped portion 7" corresponds to the open end 9a of the slit 9. In addition, in the die for forming a honeycomb structure according to the present invention, it is preferable that the "bottom portion 9b of the slit have an outwardly convex V-shape on the cross section perpendicular to the slit 9" as shown in FIG. 6. Further, in the die for forming a honeycomb structure according to the present invention, it is preferable that "the bottom portion of the slit have a "flat shape (straight shape) of which corners are straightly chamfered (C-chamfered shape)" on the cross section perpendicular to the slit." Moreover, in the die for forming a honeycomb structure according to the present invention, it is preferable that "the slit 9 have a tapered shape narrowed from the open end 9a to the bottom portion 9b of the slit on the cross section perpendicular to the slit 9" as shown in FIG. 7. The slit may have various shapes as described above. FIG. 5 is a cross-sectional view partially showing the cross section perpendicular to the slit 9 in the die for forming a honeycomb structure according to further another embodiment of the present invention (die for forming a honeycomb structure 1C). FIG. 6 is a cross-sectional view partially showing the cross section perpendicular to the slit 9 in the die for forming a honeycomb structure according to still another embodiment of the present invention (die for forming a honeycomb structure 1D). FIG. 7 is a cross-sectional view partially showing the cross section perpendicular to the slit 9 in the die for forming a honeycomb structure according to still further another embodiment of the present invention (die for forming a honeycomb structure 1E).

Figure 8:
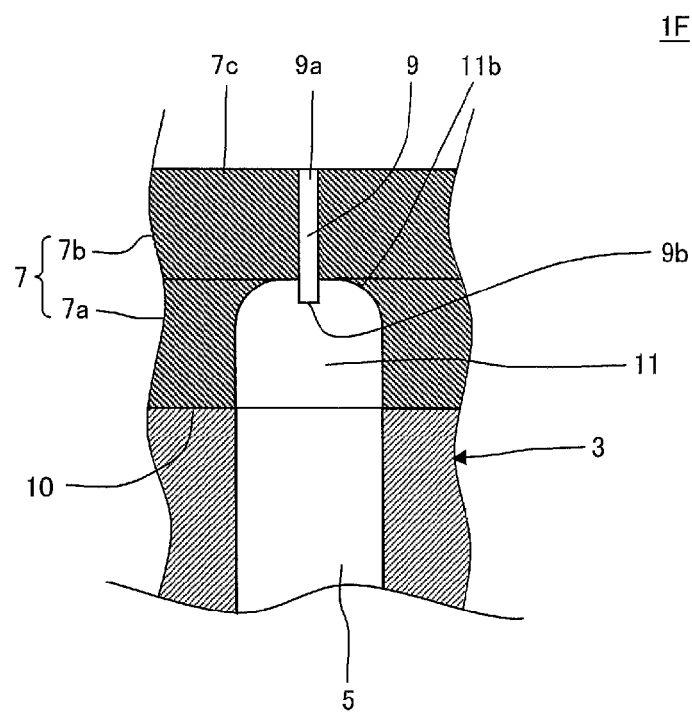
FIG. 8 is a cross-sectional view partially showing a cross section perpendicular to a surface of the first plate-shaped portion in a die for forming a honeycomb structure according to still another embodiment of the present invention.
Figure 9:
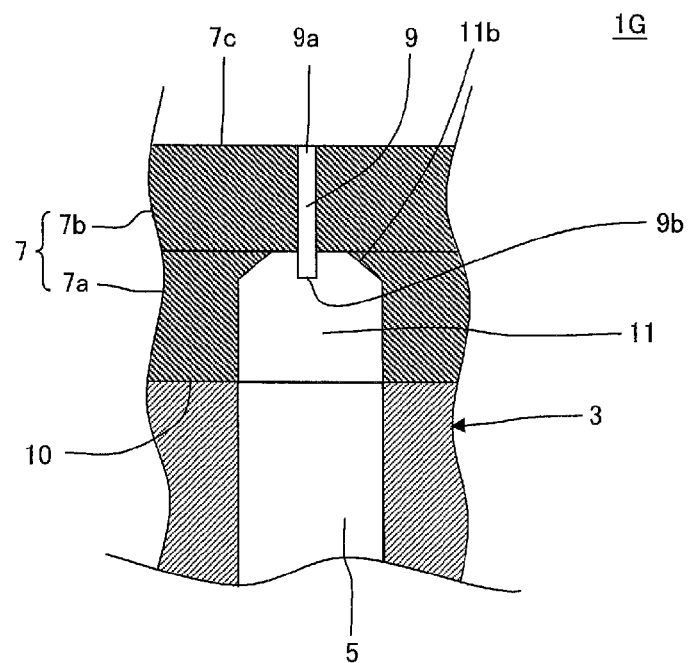
FIG. 9 is a cross-sectional view partially showing a cross section perpendicular to a surface of the first plate-shaped portion in a die for forming a honeycomb structure according to still another embodiment of the present invention.

In the die for forming a honeycomb structure according to the present invention, it is preferable that a bottom portion 11b of the cavity 11 have an outwardly convex curved shape on the cross section perpendicular to the surface 7c of the first plate-shaped portion 7 as shown in FIG. 8. In addition, in the die for forming a honeycomb structure according to the present invention, it is preferable that "the bottom portion of the cavity have a 'flat shape (straight shape) of which corners are formed in an outwardly convex curved shape' on the cross section perpendicular to the surface of the first plate-shaped portion." Furthermore, in the die for forming a honeycomb structure according to the present invention, the bottom portion 11b of the cavity 11 preferably has one of the shapes described below as shown in FIG. 9. Specifically, it is preferable that the bottom portion 11b of the cavity 11 have a "'flat shape (straight shape) of which corners are straightly chamfered (C-chamfered)' on the cross section perpendicular to the surface 7c of the first plate-shaped portion 7." The bottom portion 11b of the cavity 11 may have various shapes as described above. It is noted that, in the die for forming a honeycomb structure 1E shown in FIG. 7, "the bottom portion 11b of the cavity 11 has a 'flat shape (straight shape)' on a cross section perpendicular to the surface of the first plate-shaped portion." This may also be referred to as the bottom portion 11b of the cavity 11 has a shape of which corners are rectangular on the cross section perpendicular to the surface of the first plate-shaped portion. In addition, in dies for forming a honeycomb structures 1F and 1G shown in FIGS. 8 and 9, the bottom portion 9b of the slit 9 has a flat shape (straight shape) on the cross section perpendicular to the slit 9. This may also be referred to as the bottom portion 9b of the slit 9 has a shape of which corners are rectangular on the cross section perpendicular to the slit 9. FIG. 8 is a cross-sectional view partially showing a cross section perpendicular to the surface 7c of the first plate-shaped portion 7 in the die for forming a honeycomb structure according to still another embodiment of the present invention (die for forming a honeycomb structure 1F). FIG. 9 is a cross-sectional view partially showing a cross section perpendicular to the surface 7c of the first plate-shaped portion 7 in the die for forming a honeycomb structure according to still another embodiment of the present invention (die for forming a honeycomb structure 1G).

Figure 10:
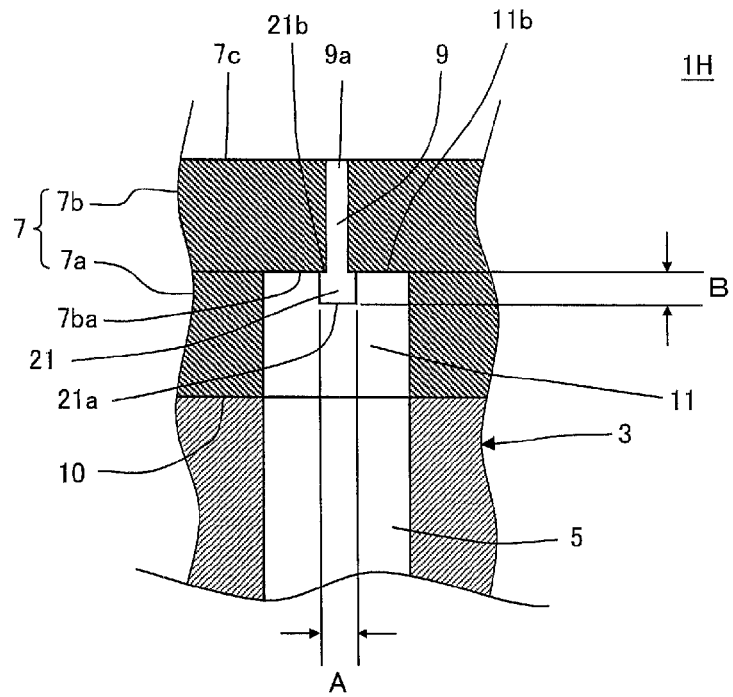
FIG. 10 is a cross-sectional view partially showing a cross section perpendicular to the slit in a die for forming a honeycomb structure according to still another embodiment of the present invention.

In the die for forming a honeycomb structure according to the present invention, it is preferable that a buffer portion be provided as "a space that is formed along the 'end of the slit in the first bonded surface side of the first plate-shaped portion,' communicates with the slit, and has a width wider than that of the slit". As shown in FIG. 10, in the die for forming a honeycomb structure according to still another embodiment of the present invention, a buffer portion 21 which is a space communicating with the end of the slit 9 "in the first bonded surface 10 side of the first plate-shaped portion 7" is provided on the cross section perpendicular to the slit 9. The width A of the buffer portion 21 is larger than the width of the slit 9. The buffer portion 21 is formed along the end of the entire slit 9 "in the first bonded surface 10 side of the first plate-shaped portion 7." Since a die for forming a honeycomb structure 1H has the buffer portion 21, the forming raw material flowing from the back hole 5 can be easily widened inside the buffer portion 21 having a wide width before it is allowed to flow into the slit 9 having a narrow width. In addition, it is possible to flow the forming raw material from the buffer portion 21 into the slit 9. As a result, it is possible to easily and uniformly flow the forming raw material to the entire slit 9. Furthermore, since the die for forming a honeycomb structure 1H has the buffer portion 21, it is possible to reduce a pressure loss when the forming raw material is extruded. The width A of the buffer portion 21 is preferably set to 0.1 to 4.0 mm, more preferably 0.2 to 3.0 mm, and particularly preferably 0.5 to 2.0 mm. If the width A of the buffer portion 21 is narrower than 0.1 mm, an effect of easily and uniformly flowing the forming raw material to the entire slit 9 may be degraded. If the width A of the buffer portion 21 is wider than 4.0 mm, the die may be easily broken in the formation. In addition, the depth B of the buffer portion 21 is preferably set to 0.05 to 5.0 mm, more preferably 0.1 to 4.0 mm, and particularly preferably 0.5 to 2.0 mm. If the depth B of the buffer portion 21 is shallower than 0.05 mm, an effect of easily and uniformly flowing the forming raw material to the entire slit 9 may be degraded. If the depth B of the buffer portion 21 is deeper than 5.0 mm, fabrication may become difficult. The depth of the buffer portion 21 is a length of the buffer portion 21 in the "thickness direction of the die for forming a honeycomb structure 1H." It is noted that the buffer portion 21 of the die for forming a honeycomb structure 1H has a rectangular shape on the cross section perpendicular to the slit 9. That is, a bottom portion 21a of the buffer portion 21 has a "flat shape (straight shape)" on the cross section perpendicular to the slit 9. In addition, a position of the buffer portion 21 "in an end 21b in the side opposite to the bottom portion 21a" in the thickness direction of the die for forming a honeycomb structure 1H is preferably set to the same position as the bottom portion 11b of the cavity 11 on the cross section perpendicular to the slit 9. "The end 21b in the side opposite to the bottom portion 21a" of the buffer portion 21 is the end of the buffer portion 21 "connected to the slit 9." FIG. 10 is a cross-sectional view partially showing the cross section perpendicular to the slit 9 in the die for forming a honeycomb structure according to still another embodiment of the present invention (die for forming a honeycomb structure 1H).

Figure 11:
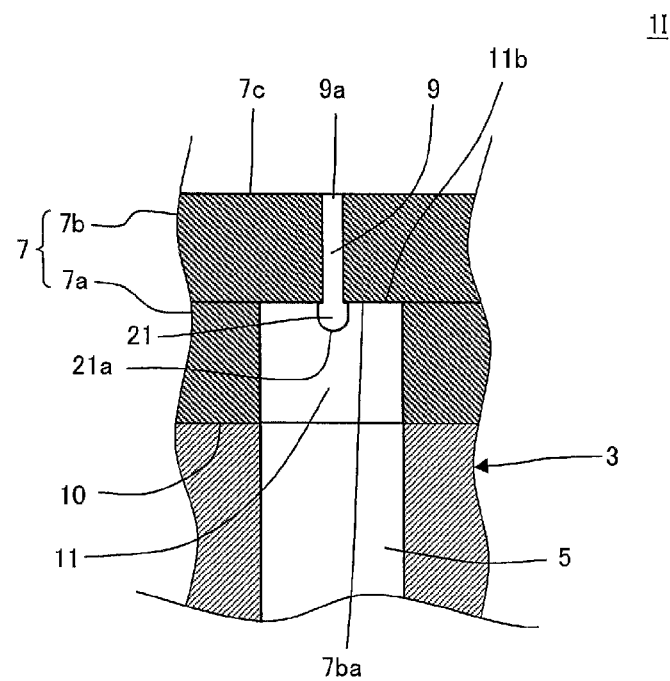
FIG. 11 is a cross-sectional view partially showing a cross section perpendicular to the slit in a die for forming a honeycomb structure according to still another embodiment of the present invention.

In the die for forming a honeycomb structure according to the present invention, it is preferable that, while the buffer portion 21 is formed, the bottom portion 21a of the buffer portion 21 have an outwardly convex curved shape on the cross section perpendicular to the slit 9 as shown in FIG. 11. FIG. 11 is a cross-sectional view partially showing the cross section perpendicular to the slit 9 in the die for forming a honeycomb structure according to still another embodiment of the present invention (die for forming a honeycomb structure 1I).

Figure 12:
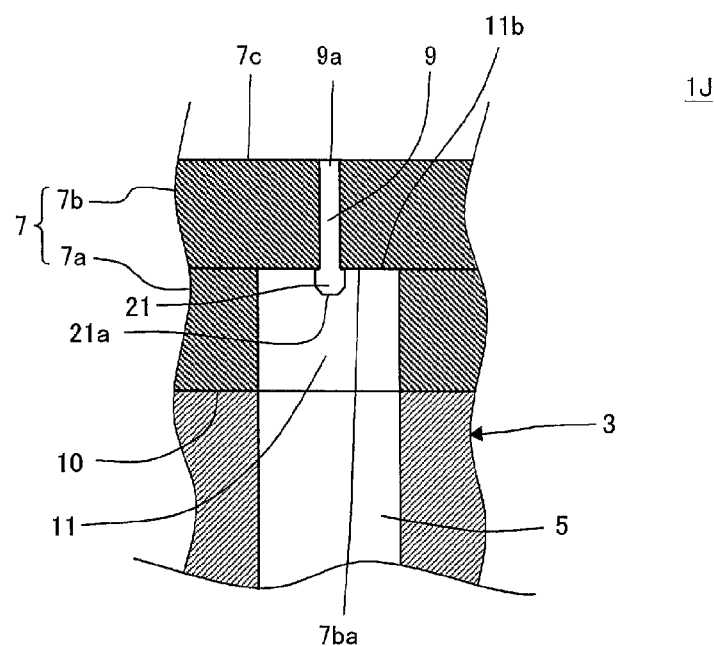
FIG. 12 is a cross-sectional view partially showing a cross section perpendicular to the slit in a die for forming a honeycomb structure according to still another embodiment of the present invention.

In the die for forming a honeycomb structure according to the present invention, it is preferable that, while the buffer portion 21 is formed, the bottom portion 21a of the buffer portion 21 have the following shape as shown in FIG. 12. Specifically, it is preferable that the bottom portion 21a be shaped such that the bottom portion 21a has a "flat shape (straight shape) of which corners are straightly chamfered (C-chamfered shape)" on the cross section perpendicular to the slit 9. In addition, it is preferable that the bottom portion of the die for forming a honeycomb structure have a "V-shaped" buffer portion on the cross section perpendicular to the slit. FIG. 12 is a cross-sectional view partially showing a cross section perpendicular to the slit 9 in the die for forming a honeycomb structure according to still another embodiment of the present invention (die for forming a honeycomb structure 1J).

Figure 13:
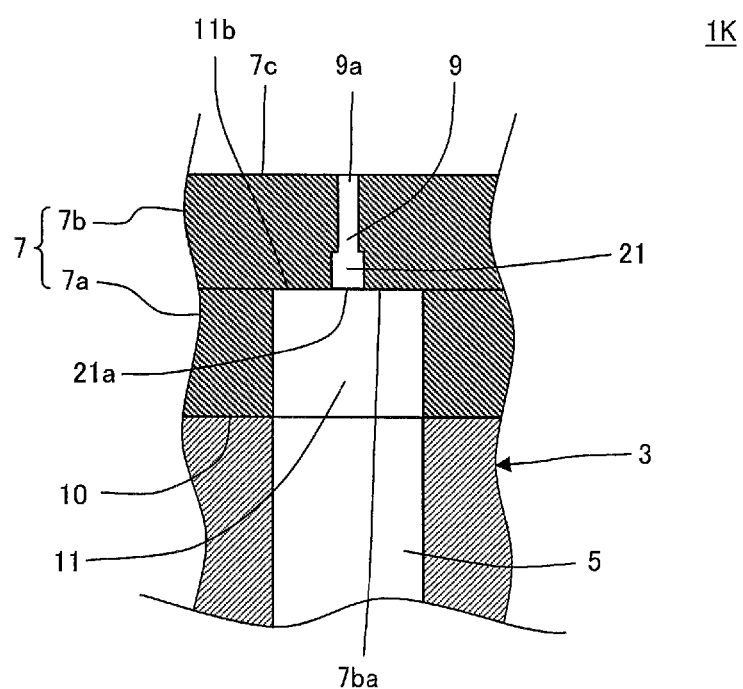
FIG. 13 is a cross-sectional view partially showing a cross section perpendicular to the slit in a die for forming a honeycomb structure according to still another embodiment of the present invention.

In the die for forming a honeycomb structure according to the present invention, while the buffer portion 21 is formed, the buffer portion 21 is arranged as described below as shown in FIG. 13. Specifically, it is preferable that the bottom portion 21a of the buffer portion be formed (arranged) to overlap with the bottom portion 11b of the cavity 11 in the thickness direction of a die for forming a honeycomb structure 1K. FIG. 13 is a cross-sectional view partially showing a cross section perpendicular to the slit 9 in the die for forming a honeycomb structure according to still another embodiment of the present invention (die for forming a honeycomb structure 1K). The buffer portion 21 may have various shapes as described above for the buffer portions of the dies for forming a honeycomb structure 1H to 1K shown in FIGS. 10 to 13.

It is noted that, in the dies for forming a honeycomb structure 1C to 1K shown in FIGS. 5 to 13, the diameter of the open end of the cavity is equal to the diameter of the open end of the back hole, and both the open ends are overlapped without a deviation. It is also preferable that the diameter of the open end of the cavity be smaller than the diameter of the open end of the back hole, and the open end of the cavity be arranged inside the open end of the back hole. In addition, in the dies for forming a honeycomb structure 1C to 1K, it is preferable that the diameter of the open end of the cavity be larger than the diameter of the open end of the back hole, and the open end of the back hole be arranged inside the open end of the cavity. Furthermore, in the dies for forming a honeycomb structure 1C to 1K shown in FIGS. 5 to 13, it is preferable that the first layer of the first plate-shaped portion and the second layer of the first plate-shaped portion are formed of the same kind. Moreover, it is preferable that the first layer of the first plate-shaped portion and the second layer of the first plate-shaped portion be formed of different kinds. The slit 9 formed in the die for forming a honeycomb structure according to the present invention may have a shape obtained by combining two or more shapes of the same shapes of the slits 9 of the dies 1C to 1F for forming a honeycomb structure 1C to 1F shown in FIGS. 5 to 8. In addition, the cavity formed in the die for forming a honeycomb structure according to the present invention may have a shape obtained by combining two or more shapes of the same shapes of the cavities 11 of the dies for forming a honeycomb structure 1F to 1H shown in FIGS. 8 to 10. Moreover, the buffer portion formed in the die for forming a honeycomb structure according to the present invention may have a shape obtained by combining two or more shapes of the same shapes of the buffer portions 21 of the dies for forming a honeycomb structure 1H to 1K shown in FIGS. 10 to 13.

(2) Method of Manufacturing Die for Forming Honeycomb Structure of the Present Invention:

Next, a description will be made for a method of manufacturing a die for forming a honeycomb structure according to the present invention, which is a method of manufacturing a die for forming a honeycomb structure of an embodiment of the present invention (die for forming a honeycomb structure 1) according to the present invention of FIGS. 1 to 4A. The method for manufacturing the die for forming a honeycomb structure according to the present invention is manufactured as follows. Specifically, the method is a method of manufacturing the die for forming a honeycomb structure by bonding a "second plate-shaped member that is formed of free cutting material and has back holes for introducing the formation raw material" and a first plate-shaped member. The first plate-shaped member includes a "first layer" and a "second layer arranged on the first layer." The first layer is preferably formed of tungsten carbide based cemented carbide having a Vickers hardness of 300 to 2000 HV and a Young's modulus of 200 to 600 GPa. The second layer is preferably formed of tungsten carbide based cemented carbide having a Vickers hardness of 500 to 3000 HV and a Young's modulus of 400 to 700 GPa. The first layer has cavities opened on both sides. In addition, the second layer has slits opened on both sides. Furthermore, the Vickers hardness and the Young's modulus of the second layer are preferably higher than the Vickers hardness and the Young's modulus of the first layer. If the die for forming a honeycomb structure is manufactured through the aforementioned method, it is possible to lengthen a service life of the thus obtained die for forming a honeycomb structure.

(2-1) Second Plate-Shaped Member:

The second plate-shaped member is prepared by forming a plurality of back holes 5 (through holes) in a disk formed of free cutting material (process (1)). Each condition such as the "diameter of the open end" of the back hole 5 is preferably set to the same condition as the preferable condition of the aforementioned die for forming a honeycomb structure according to an embodiment of the present invention.

The back holes 5 may be formed, for example, using various machining methods such as electrochemical machining (ECM), electrical discharge machining (EDM), laser machining, and mechanical machining such as drilling without a particular limitation. Out of these methods, the electrochemical machining (ECM) is preferably employed. Using the electrochemical machining (ECM), it is possible to form the back holes efficiently and accurately.

(2-2) First Plate-Shaped Member:

The first plate-shaped member is preferably prepared by bonding a first cemented carbide plate and a second cemented carbide plate. In addition, the first cemented carbide plate is preferably prepared by forming a plurality of cavity formation through holes serving as the cavities in a plate formed of tungsten carbide based cemented carbide having a Vickers hardness of 300 to 2000 HV and a Young's modulus of 200 to 600 GPa. The cavity formation through hole is a portion serving as a cavity "in the prepared die for forming a honeycomb structure." In addition, the second cemented carbide plate is preferably formed of tungsten carbide based cemented carbide having a Vickers hardness of 500 to 3000 HV and a Young's modulus of 400 to 700 GPa. As described above, if the first plate-shaped member is prepared by bonding the first cemented carbide plate having the through holes formed in advance with the second cemented carbide plate, it is possible to remarkably reduce a manufacturing time, compared to a case where cavities are formed in a plate-shaped member having no cavity. This is because the time taken to form a through hole in a plate-shaped member is shortened than the time taken to form a cavity (hollow having an aperture only on a single side of the plate-shaped member) in a plate-shaped member.

The Vickers hardness and the Young's modulus of the second cemented carbide plate are preferably higher than the Vickers hardness and the Young's modulus of the first cemented carbide plate.

The through hole may be formed in the first cemented carbide plate, for example, using various machining methods such as electrochemical machining (ECM), electrical discharge machining (EDM), laser machining, and mechanical machining such as drilling without a particular limitation. Out of these methods, the electrochemical machining (ECM) is preferably employed. Using the electrochemical machining (ECM), it is possible to form the back holes efficiently and accurately.

The first cemented carbide plate and second cemented carbide plate may be bonded to each other, for example, using an adhesive or a double-sided tape without a particular limitation. In addition, a bonding method using brazing material (brazing bonding) or a bonding method using hot pressing (direction bonding using hot pressing) may also be employed. Furthermore, both the brazing bonding and the hot pressing may also be employed.

In the method of manufacturing a die for forming a honeycomb structure according to this embodiment, the diameter $d_1$ of the open end of the cavity 11 (cavity formation through hole) is equal to the diameter $D_1$ of the open end of the back hole 5 (refer to FIG. 4A). Meanwhile, in the method of manufacturing a die for forming a honeycomb structure according to the present invention, it is also preferable that the diameters $d_1$ and $D_1$ be different from each other. The number of cavities 11 is equal to the number of back holes 5, and the cavities 11 are arranged in the same positions of those of the back holes 5 when the first plate-shaped member and second plate-shaped member are bonded to each other.

Then, second plate-shaped member and the first plate-shaped member are bonded to each other (process (A)). Here, one surface of the second plate-shaped member is referred to as a second bonded surface 6 (the surface serving as the second bonded surface 6 of the second plate-shaped portion 3) (refer to FIG. 4A). In addition, the "surface" of the first plate-shaped member "in the first layer side" is set to the first bonded surface 10 (the surface serving as the first bonded surface 10 of the first plate-shaped portion 7) (refer to FIG. 4A). In the process (A), while the second bonded surface and the first surface face each other, the first plate-shaped member and second plate-shaped member are stacked and the first plate-shaped member and second plate-shaped member are bonded to each other. As a result, the second bonded surface of the second plate-shaped member and the first bonded surface of the first plate-shaped member are bonded to each other.

When the first plate-shaped member and second plate-shaped member are stacked to each other, a bonding material is preferably arranged between the first plate-shaped member and second plate-shaped member. In addition, the first plate-shaped member and second plate-shaped member are preferably bonded to each other while the bonding material is arranged between the first plate-shaped member and second plate-shaped member. The bonding material preferably has a film shape, a sheet shape, a plate shape, and the like.

The bonding material is preferably formed of, for example, metal or alloy containing at least one selected from a group consisting of copper (Cu), silver (Ag), gold (Au), nickel (Ni), and aluminum (Al). In addition, it is preferable that the bonding material penetrate into the inside of at least one of the first plate-shaped portion and the second plate-shaped portion when pressing (hot pressing) while heating are performed while the bonding material is interposed between the first plate-shaped member and the second plate-shaped member. If the bonding material is configured in this manner, it is possible to improve bonding between the first plate-shaped portion and second plate-shaped portion.

The bonding material may further contain an additive such as palladium (Pd), silicon (Si), tin (Sn), cobalt (Co), phosphorus (P), manganese (Mn), zinc (Zn), and boron (B). If such an additive is further contained, it is possible to lower a bonding temperature and improve reliability.

In order to stack and bond the first plate-shaped member and second plate-shaped member to each other, a stack of the first plate-shaped member and second plate-shaped member is preferably bonded through hot pressing. A temperature of the hot pressing is preferably set to 900 to 1200° C., and more preferably 1000 to 1150° C. Heating at such a temperature enables excellent bonding between the first plate-shaped member and second plate-shaped member and prevents degradation of the strength of the second plate-shaped member. In addition, a hot pressing time is preferably set to 1 minute to 1 hour, and more preferably 10 to 45 minutes. If the hot pressing time is shorter than 1 minute, it may be difficult to bond the first plate-shaped member and second plate-shaped member to each other with a strong bonding strength. If the hot pressing time is longer than 1 hour, base material degrading phase may easily be occurred on the first plate-shaped member and second plate-shaped member. A pressure of the hot pressing may be appropriately determined depending on shapes, sizes, and the like of the first plate-shaped member and second plate-shaped member. For example, the pressure is preferably set to 0.01 to 100 MPa, and more preferably 0.1 to 10 MPa. As a hot pressing machine, for example, a FVHP-R manufactured by "Fujidempa Kogyo Co., Ltd." may be employed.

Then, slits 9 communicating with the cavities 11 and the back holes 5 are formed from "the side (surface) opposite to the first bonded surface" of the first plate-shaped member so that the die for forming a honeycomb structure 1 is obtained (refer to FIGS. 1 to 4A). As a method of forming slits in the first plate-shaped member, any one of methods known in the art such as grinding using a diamond grinding wheel may be appropriately employed without a particular limitation. In the die for forming a honeycomb structure 1 of FIGS. 1 to 4A, a planar shape (slit formation pattern) of the cell block 13 formed by the slits 9 is rectangular. Each condition of the slit such as the slit formation pattern is preferably set to the same condition as the preferable condition described in relation to the aforementioned die for forming a honeycomb structure according to an embodiment of the present invention.

EXAMPLES

Hereinafter, examples of the present invention will be described in more detail. Note that such examples are not intended to limit the invention.

Example 1

First, two thousands of back holes (through hole) having a diameter of 2 mm (diameter on the cross section perpendicular to the thickness direction of the plate-shaped member) were formed in a plate-shaped member (second plate-shaped member) formed of stainless steel (SUS303) through electrical discharge machining (EDM). The back holes had a cylindrical shape (circular shape on the cross section perpendicular to the thickness direction of the plate-shaped member). As a result, the "diameter of the open end of the back hole on the second bonded surface" became 2 mm. The second plate-shaped member had a disk shape having a diameter of 200 mm. In addition, the second plate-shaped member had a thickness of 50 mm. The area where the back holes are formed (back hole formation area) had a circular shape centered at the center of the first plate-shaped member, and had a diameter of 150 mm. The back holes had a pitch of 5 mm.

Then, the first plate-shaped member was prepared by bonding the first cemented carbide plate and second cemented carbide plate. The first cemented carbide plate serves as the first layer of the first plate-shaped portion. In addition, the second cemented carbide plate serves as the second layer of the second plate-shaped portion. The first cemented carbide plate was prepared by forming a plurality of cavity formation through holes serving as cavities in a plate formed of tungsten carbide based cemented carbide having a Vickers hardness of 300 HV and a Young's modulus of 300 GPa. Furthermore, the first cemented carbide plate had a disk shape having a diameter of 200 mm. The first cemented carbide plate had a thickness of 1 mm. The "diameter (diameter on a cross section perpendicular to the thickness direction of the plate-shaped member), the number, and the pitch" of the cavity formation through holes were equal to those of the back holes of the second plate-shaped member, and the locations of the open ends of the cavity formation through holes matched the locations of the open ends of the back holes without a deviation. Furthermore, the second cemented carbide plate was formed of tungsten carbide based cemented carbide having a Vickers hardness of 2000 HV and a Young's modulus of 600 GPa. As described above, the Vickers hardness and the Young's modulus of the second cemented carbide plate were larger than the Vickers hardness and the Young's modulus of the first cemented carbide plate.

The through holes of the first cemented carbide plate were formed using electrochemical machining.

The first cemented carbide plate and second cemented carbide plate were bonded to each other using an adhesive.

Then, the first plate-shaped member and second plate-shaped member were stacked by interposing a bonding material therebetween. In order to stack the first plate-shaped member and second plate-shaped member, they were arranged such that the first bonded surface, which is "the surface in the first cemented carbide plate side," of the first plate-shaped member faces the second bonded surface, which is one surface of the second plate-shaped member. As the bonding material, a film-shaped aluminum (Al) having a thickness of 0.01 mm was employed.

Then, the stack of the first plate-shaped member and second plate-shaped member was hot-pressed under a pressure of 0.5 MPa at a temperature of 900° C. for 0.5 hours to bond the first plate-shaped member and second plate-shaped member to each other. In the hot pressing, it is preferable that the "stack of the first plate-shaped member and second plate-shaped member" be interposed and pressed using a "plate-shaped pressing member" having a size larger than those of the first plate-shaped member and second plate-shaped member. As a result, it is possible to uniformly press the stack. It is a target material is "pressing while heating."

The assembly obtained by "bonding the first plate-shaped member and second plate-shaped member to each other" in this manner was cooled to an ambient temperature, and the slits were formed in the first plate-shaped member, so that the die for forming a honeycomb structure having the structure shown in FIGS. 1 to 4A was obtained. The slits were formed in a lattice shape communicating with the cavities using a diamond grinding wheel. The slits had a width of 0.5 mm and a pitch of 5 mm. The slits were formed such that the cavities are positioned in the intersection between the slits. In the die for forming a honeycomb structure obtained in this manner, the open end of the cavity on the first bonded surface matched the open end of the back hole on the second bonded surface. A "crack inspection" and a "formation test" were performed for the obtained die for forming a honeycomb structure as described below. A result of the test is shown in Table 1. In Table 1, the "yield" represents a result of the "formation test."

(Crack Inspection)

As a ceramic raw material, a mixture of alumina, talc, and kaolin is used. An organic binder is mixed with this mixture, water is added, and kneading is performed, so that kneaded material (formation raw material) is prepared using a vacuum pugmill. The obtained kneaded material is formed using an extrusion machine installed with the die for forming a honeycomb structure to obtain a cylindrical honeycomb formed body (honeycomb structure). The process of manufacturing the honeycomb formed body is repeated 100 times. Then, a crack was inspected in the die for forming a honeycomb structure by observing a microscope having a zoom ratio of ×200.

(Formation Test)

As a ceramic raw material, a mixture of alumina, talc, and kaolin is used. An organic binder is mixed with this mixture, water is added, and kneading is performed, so that kneaded material (forming raw material) is prepared using a vacuum pugmill. The obtained kneaded material is formed using an extrusion machine installed with the die for forming a honeycomb structure to obtain a cylindrical honeycomb formed body (honeycomb structure). Then, the obtained honeycomb formed body is dried using a dielectric drier and is then fired at a high temperature using a firing furnace to obtain a honeycomb structure. Through this method, 100 honeycomb structures are manufactured. A visual inspection is performed for the obtained honeycomb structures on whether or not there is a "distortion" in the cell. A honeycomb structure having no distortion is classified as a quality product, and a honeycomb structure having a distortion is classified as a defective product, so that a yield of the quality product is calculated (100×number of quality products/total number of products) (%).

TABLE 1

|  | crack inspection | yield (%) |
| --- | --- | --- |
| Example 1 | No | 99 |
| Example 2 | No | 99 |
| Example 3 | No | 99 |
| Comparative Example 1 | Yes | 0 |

Example 2

A die for forming a honeycomb structure was prepared as in Example 1 except that the diameter of the cavity of the first plate-shaped portion is larger than the diameter of the back hole of the second plate-shaped portion, and the open end of the back hole on the second bonded surface is arranged inside the open end of the cavity on the first bonded surface. It is noted that the open end of the cavity on the first bonded surface had a diameter of 2.0 mm. In addition, the cavity had a depth of 5 mm. Furthermore, the open end of the back hole on the second bonded surface had a diameter of 1.5 mm. The "crack inspection" and the "formation test" were performed for the obtained die for forming a honeycomb structure. A result of the test is shown in Table 1.

Example 3

A die for forming a honeycomb structure was prepared as in Example 1 except that the diameter of the back hole of the second plate-shaped portion is larger than the diameter of the cavity of the first plate-shaped portion, and the open end of the cavity on the first bonded surface was arranged inside the open end of the back hole on the second bonded surface. It is noted that the open end of the back hole on the second bonded surface was arranged outside the open end of the cavity of the first bonded surface. The open end of the cavity on the first bonded surface had a diameter of 2.0 mm. In addition, the cavity had a depth of 5 mm. In addition, the open end of the back hole on the second bonded surface had a diameter of 1.5 mm. The "crack inspection" and the "formation test" were performed for the obtained die for forming a honeycomb structure. A result of the test is shown in Table 1.

Comparative Example 1

A die for forming a honeycomb structure was prepared as in Example 1 except that the first plate-shaped member is a (single-layered) plate-shaped member formed of tungsten carbide based cemented carbide (cemented carbide) having a Vickers hardness of 2000 HV and a Young's modulus of 600 GPa. In the obtained die for forming a honeycomb structure, the first plate-shaped member and second plate-shaped member were bonded to each other while the back holes and the cavities are deviated from each other. The "crack inspection" and the "formation test" were performed for the obtained die for forming a honeycomb structure. A result of the test is shown in Table 1.

Referring to Table 1, it is recognized that the dies for forming a honeycomb structure of Examples 1 to 3 have a long service life without a crack. In comparison, it is recognized that the die for forming a honeycomb structure of Comparative Example 1 has a crack and a short service life. In addition, it is recognized that excellent formability is obtained if a honeycomb structured-formed body is formed using the dies for forming a honeycomb structure in Examples 1 to 3. Meanwhile, in the die for forming a honeycomb structure of Comparative Example 1, the first plate-shaped member and second plate-shaped member are bonded to each other while the back holes and the cavities are deviated. Therefore, it was revealed that a distortion is easily generated in the formed honeycomb structure, and a yield is degraded in the manufacturing of the honeycomb structure.

INDUSTRIAL APPLICABILITY

The die for forming a honeycomb structure according to the present invention may be employed in manufacturing of a honeycomb structure used in a catalyst carrier, a filter that traps particulates in an exhaust gas, and the like.

DESCRIPTION OF REFERENCE NUMERALS 1, 1A, 1B, 1C, 1D, 1E, 1F, 1G, 1H, 1I, 1J, 1K: die for forming honeycomb structure, 3: second plate-shaped portion (second plate-shaped member), 5: back hole, 5a: open end of back hole, 6: second bonded surface, 7: first plate-shaped portion (first plate-shaped member), 7a: first layer, 7b: second layer, 7ba: one surface of second layer, 7c: surface, 9: slit, 9a: open end of slit, 9b: bottom portion of slit, 10: first bonded surface, 11: cavity, 11a: open end of cavity, 11b: bottom portion, 13: cell block, 21: buffer portion, 21a: bottom portion of buffer portion, 21b: end (end of the buffer portion in the side opposite to the bottom portion), $d_1$: diameter of open end of cavity, $D_1$: diameter of open end of back hole, h: depth of cavity.

The invention claimed is:

1. A die for forming a honeycomb structure, comprising:
   a second plate-shaped portion having back holes for introducing a forming raw material; and
   a first plate-shaped portion that has cavities communicating with the back holes and slits communicating with the cavities and is formed of tungsten carbide based cemented carbide,
   wherein the second plate-shaped portion is formed of a material containing at least one selected from a group consisting of iron, steel, aluminum alloy, copper alloy, titanium alloy, and nickel alloy,
   the first plate-shaped portion has a first layer that contacts the second plate-shaped portion and a second layer arranged on the first layer,
   the cavities are opened on both sides of the first layer, a bottom portion of the cavity on a side of the second layer has a flat shape, a flat shape of which corners are straightly chamfered, or an outwardly convex curved shape on a cross section perpendicular to a surface of the first plate-shaped portion, and
   the slits are opened on both sides of the second layer.

2. The die for forming a honeycomb structure according to claim 1, wherein the first layer has a thickness of 0.1 to 90 mm.

3. The die for forming a honeycomb structure according to claim 1, wherein the second layer has a thickness of 0.5 to 10 mm.

4. The die for forming a honeycomb structure according to claim 2, wherein the second layer has a thickness of 0.5 to 10 mm.

5. The die for forming a honeycomb structure according to claim 1, wherein a diameter of the cavity is different from that of the back hole.

6. The die for forming a honeycomb structure according to claim 2, wherein a diameter of the cavity is different from that of the back hole.

7. The die for forming a honeycomb structure according to claim 3, wherein a diameter of the cavity is different from that of the back hole.

8. The die for forming a honeycomb structure according to claim 4, wherein a diameter of the cavity is different from that of the back hole.

9. The die for forming a honeycomb structure according to claim 5, wherein the cavity has a diameter larger than a diameter of the back hole, and the diameter of the cavity is 1.01 to 1.50 times of the diameter of the back hole.

10. The die for forming a honeycomb structure according to claim 5, wherein the back hole has a diameter larger than a diameter of the cavity, and the diameter of the back hole is 1.01 to 1.50 times of the diameter of the cavity.

11. The die for forming a honeycomb structure according to claim 1, wherein a physical property of the tungsten carbide based cemented carbide of the first layer is different from a physical property of the tungsten carbide based cemented carbide of the second layer.

12. The die for forming a honeycomb structure according to claim 11, wherein the first layer is formed of tungsten carbide based cemented carbide having a Vickers hardness of 300 to 2000 HV and a Young's modulus of 200 to 600 GPa,
   the second layer is formed of tungsten carbide based cemented carbide having a Vickers hardness of 500 to 3000 HV and a Young's modulus of 400 to 700 GPa, and
   the Vickers hardness and the Young's modulus of the second layer are higher than the Vickers hardness and the Young's modulus of the first layer.

13. The die for forming a honeycomb structure according to claim 1, further comprising a buffer portion which is a space that is formed along an end of the slit in a first bonded surface side of the first plate-shaped portion, communicates with the slit, and has a width larger than a width of the slit.

14. The die for forming a honeycomb structure according to claim 1, wherein a bottom portion of the slit on a side of a first bonded surface has a flat shape, a flat shape having straightly chamfered corners, an outwardly convex curved shape, or an outwardly convex V-shape on a cross section perpendicular to the slit.

15. The die for forming a honeycomb structure according to claim 13, wherein a bottom portion of the buffer portion on a side of the first bonded surface has a flat shape, a flat shape having straightly chamfered corners, an outwardly convex curved shape, or an outwardly convex V-shape on a cross section perpendicular to the slit.

* * * * *